United States Patent [19]

Sury et al.

[11] 4,176,060

[45] Nov. 27, 1979

[54] PROCESS FOR SOLUBLE CYANIDE REMOVAL FROM WASTEWATER STREAMS

[75] Inventors: Yel S. Sury; Melvin J. Guillory, Jr., both of Baton Rouge, La.

[73] Assignee: Ciba-Geigy Corporation, Ardsley, N.Y.

[21] Appl. No.: 866,439

[22] Filed: Jan. 3, 1978

[51] Int. Cl.$^2$ .............................................. C02B 1/36
[52] U.S. Cl. ............................. 210/62; 210/DIG. 31
[58] Field of Search ................. 210/62, DIG. 31, 50, 210/51

[56] References Cited

FOREIGN PATENT DOCUMENTS

| | | | |
|---|---|---|---|
| 1517682 | 11/1971 | Fed. Rep. of Germany | 210/DIG. 31 |
| 2709722 | 9/1977 | Fed. Rep. of Germany | 210/DIG. 31 |
| 49-27060 | 3/1974 | Japan | 210/DIG. 31 |

*Primary Examiner*—Thomas G. Wyse
*Attorney, Agent, or Firm*—Frederick H. Rabin; Harry Falber

[57] ABSTRACT

A process for destroying the soluble cyanide complex content of industrial wastewater streams which comprises acidification of the stream and chlorination at temperatures of at least 80° C., the soluble cyanide complexes breaking down to free $CN^-$ which subsequently hydrolyzes to ammonium chloride and carbon dioxide.

11 Claims, No Drawings

PROCESS FOR SOLUBLE CYANIDE REMOVAL FROM WASTEWATER STREAMS

The problem of cyanide pollution in industrial wastewater streams is of ever-increasing concern. Industry is investing substantial amounts of money to minimize such pollution in order to satisfy governmental imposition of stringent pollution standards. Such cyanide pollution may stem from a variety of chemical industries, e.g. from the manufacture of triazine herbicides, and may derive from plant water as well as tank car or storage tank washings.

"Total" cyanide in such effluent streams comprises both "oxidizable", or free, and "non-oxidizable" cyanide. "Oxidizable", or free cyanides include the free $CN^-$ ion and certain metal cyanide complexes other than iron cyanide complexes, e.g. $Ag(CN)_2^{-1}$. They are subject to chlorine oxidation under alkaline conditions to form cyanates. The "non-oxidizable", insoluble iron cyanides include such complexes as $Fe_3(II)[Fe(III)(CN)_6]_2$, $Fe_4(III)[Fe(II)(CN)_6]_3$ and $Fe_2(II)Fe(II)(CN)_6$. The "non-oxidizable", soluble cyanides are complexes of the formula $X_3Fe(III)(CN)_6$ or $X_4Fe(III)(CN)_6$, wherein X can be an alkaline or alkaline-earth metal, hydrogen or ammonium ion.

Various procedures have been developed in order to minimize the cyanide complex content. The most common approach for destroying soluble iron cyanide complexes has been alkaline chlorination wherein, at a basic pH level, $CN^-$ is converted to $OCN^-$. It has been determined, however, that this method results in incomplete destruction of the soluble cyanide present in iron complexed form. A further approach has attempted to rely on the effectiveness of filtration for removing insoluble iron cyanide complexes from aqueous HCN waste systems. Thus, the attempt was made to complex all available HCN effluent to the insoluble form so as to make it available for filtration. While substantial $CH^-$ reduction was achieved with this approach, difficulties such as incomplete complexing and/or partial solubility of the complex prevented reduction to acceptable levels. A further approach has been disclosed in U.S. Pat. No. 3,788,983. This process relies on the use of anion exchange resins to remove ferrocyanide complexes. While once again there is a reduction of the cyanide content, a significant amount is still not destroyed, this residual amount being apparently attributable to the presence of the ferricyanide form.

Accordingly, it is the primary object of this invention to provide a process for substantially completely destroying the soluble cyanide complex content of industrial wastewater streams.

It is a further object to provide a process which, in effect, facilitates a total cyanide complex removal scheme.

It is another object to provide a process which is both efficient and rapid in effecting the cyanide complex reduction.

Various other objects and advantages of this invention will become apparent from the following description thereof.

We have now found that by conducting a hot acid chlorination technique, the soluble cyanide complex content of industrial wastewater streams can be reduced to a level below about 1 ppm. Thus, by contacting the wastewater at a temperature in excess of about 80° C., and preferably in excess of about 95° C., with sufficient mineral acid such as hydrochloric, sulfuric, nitric, phosphoric, and the like to provide a pH level below about 3.0 and with additional chlorine, rapid, efficient, complete reduction of the soluble cyanide complex is achieved. In contrast to prior art systems which were either totally ineffective or only marginally effective in destroying these complexes, the instant process allows for substantially total destruction. As a result, a process scheme can be developed for rapid and efficient destruction of the total cyanide complex.

It is believed that the increased speed of decomposition resulting from the instant process is attributable to the equilibrium reaction unfavorable to the formation of free HCN

$$H_3Fe(CN)_6 + 3 HCl \rightleftharpoons 6 HCN + FeCl_3$$

The addition of $Cl_2$ to the hot acid medium then results in the rapid reaction $HCN + Cl_2 \rightarrow CNCl + HCl$ which, in turn, rapidly drives the first reaction to completion. Thus, the chemical equilibrium phenomenon which impedes the decomposition of $Fe(CN)_6$ anion in hot acid media is overcome in the instant process.

The chemistry of the destruction of soluble iron cyanide by hot acid chlorination is as follows

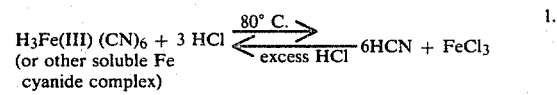

1. $H_3Fe(III)(CN)_6 + 3 HCl \underset{\text{excess HCl}}{\overset{80°C}{\rightleftharpoons}} 6HCN + FeCl_3$ (or other soluble Fe cyanide complex)

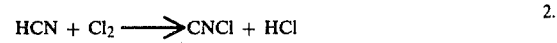

2. $HCN + Cl_2 \longrightarrow CNCl + HCl$

3. $CNCl + 2 H_2O \xrightarrow[HCl]{80°C} NH_4Cl + CO_2$

It should be recognized that although the above equations refer to iron cyanides, the instant process is equally applicable to all other forms of soluble metal cyanide complexes. These include sodium, potassium, ammonium, copper, zinc, silver, nickel and cadmium complexes.

As previously noted, the cyanide complexes may be derived from plant aqueous effluent including HCN tank car and storage tank washings. It is necessary to first filter these combined washings in order to remove the fine insoluble iron cyanide complexes [e.g. $Fe_3(Fe(CN)_6)_2$]. Thereafter, the filtered aqueous system is acidified by being contacted with generally from about 5 to 15 times, by volume of the washings, of hydrochloric acid, the acid generally being from about 5 to 15% HCl (e.g. volume ratio of 11% HCl to HCN tank washings is about 11:1). These values are selected so as to obtain a final acid strength in the system of at least about 5.5%. The amount and concentration of acid are also selected so as to insure a pH level in the system of less than about 3.0. The system is then heated to a temperature above about 80° C. whereupon chlorine is introduced into the system in a concentration reflecting a stoichiometric excess of at least about 100%. The chlorine may be in the form of gaseous chlorine or a chlorine agent such, for example, as sodium hypochlorite, calcium hypochlorite, and the like. Contact periods ranging from about one to fifteen minutes will generally be sufficient to reduce the complex level to less than 1 ppm. Excess dissolved chlorine in the effluent is then destroyed by such reducing compounds as sodium bisulfite, sodium sulfite, ferrous sulfate, sulfur dioxide, and the like. Chlorine gas contacted with acid may be removed by such techniques as by scrubbing with hydroxides of alkali or alkaline-earth metals, or by utilization of the chlorine in chemical reactions. As evidenced by the nature of the process, the procedure can be conducted on either a batch or a continuous basis.

A preferred method of conducting this process is by means of a countercurrent column operation. Thus, the acidified washings are fed to the top of a packed-bed column. The packing may be any conventional type such as Intalox ® ceramic saddles. Live steam is added at the column bottom to help strip out CNCl. A countercurrent flow of gaseous chlorine is then initiated from the bottom of the column for the above noted period of time. This countercurrent column operation is preferred in view of the low solubility of chlorine in hydrochloric acid at 80° C. Thus, the column will ensure a better gas-liquid contact and a more efficient utilization of chlorine.

It is to be noted that the above noted process variables enable the process to function in the desired manner. Thus, utilizing temperatures less than about 80° C. and/or pH levels greater than about 3.0 do not allow for adequate destruction of the soluble cyanide complexes. Furthermore, analytical procedures for determining total cyanide are known to those skilled in the art. One method which can be utilized to detect both free cyanide and metal cyanide complexes is the EPA approved distillative method appearing in "Standard Methods for the Examination of Water and Wastewater", 14th Ed., 1975, pages 365–371.

A complete cyanide removal sequence can be developed around the novel process of this invention. Thus, (1) polymers and fine insoluble iron cyanide complexes are removed by filtration; (2) soluble cyanide complexes are destroyed by the instant hot acid chlorination technique; and (3) CNCl and $NH_3$—N are removed by a "Breakpoint Chlorination" technique. The latter involves destruction of the above compounds in a two pH stage chlorination. In the first stage chlorination, the pH is adjusted to approximately 9.5 or greater and chlorine, in the form of chlorine gas or NaOCl, $Ca(OCl)_2$ or HOCl, is added in sufficient quantity to oxidize free cyanide to CNCl. The CNCl thus formed, and pre-existing CNCl, hydrolyze relatively rapidly to NaOCN at the given pH:

$$CN^- + Cl_2 \rightarrow CNCl + Cl^- \quad (1)$$

$$CNCl + 2NaOH \rightarrow NaOCN + NaCl + H_2O \quad (2)$$

The pH can be maintained with a mineral acid (e.g. HCl or $H_2SO_4$) and/or base (Alkali- or alkaline-earth hydroxide).

The pH of the above treated waste is adjusted to a pH of about 6–9, and preferably 7–8, and additional chlorine added (if insufficient dissolved chlorine is not already present in the waste) to affect the "breakpoint chlorination" of $OCN^-$ and $NH_3$—N. As a result, innocuous nitrogen, carbon dioxide, water and chloride ion are formed:

$$OCN^- + OCl^- \rightarrow \tfrac{1}{2}N_2 + CO_2 + Cl^- \quad (1)$$

$$NH_4^+ + 2OCl^- \rightarrow \tfrac{1}{2}N_2 + 2H_2O + Cl^- \quad (2)$$

Residual chlorine may be removed by a reducing agent such as sodium sulfite or bisulfite, ferrous sulfate or sulfur dioxide. Accordingly, a total cyanide complex removal program, not heretofore developed in the art, is now available.

The following examples will further illustrate the embodiment of this invention. In these examples, all parts given are by weight unless otherwise noted.

EXAMPLE I

This example illustrates the existing difficulty of removing soluble iron cyanide complexes, in this instance by means of the conventional alkaline chlorination technique.

An aqueous solution of $K_3(Fe(CN)_6)$ equivalent to 19.9 ppm $CN^-$ was prepared from reagent grade $K_3(Fe(CN)_6)$ and distilled water. The solution analyzed at 18.7 ppm total $CN^-$. The pH of the solution was adjusted to 9.0 with reagent 50%, by weight, sodium hydroxide and, with good agitation, a 200% excess of 4% chlorine (as NaOCl solution) was added. The mixture was agitated for 30 minutes at room temperature and the pH remained above 9. After the hold period, excess chlorine was destroyed with $NaHSO_3$. The residual total $CN^-$ after treatment was 2.5 ppm, an unacceptable level. Thus, it is seen that the procedures known heretofore were not acceptable techniques for destroying soluble cyanide complexes.

EXAMPLE II

This example illustrates one embodiment of the novel process of this invention.

A solution of actual HCN plant effluent with added soluble iron cyanide complex ($K_3Fe(CN)_6$) was treated by hot acid chlorination as follows:

The solution for chlorination was prepared as follows:

| | Quantity | Total Cyanide, ppm |
|---|---|---|
| Plant #1 HCl Effluent | 1,000 ml. | — |
| Plant #2, Effluent Stream #1 | 510 ml, | 5.3 |
| Plant, #2, Effluent Stream #2 | 490 ml. | 0.2 |
| Reagent $K_3Fe(CN)_6$ | 0.1055 g* | — |

*Equivalent to 25 ppm $CN^-$ in solution.

The solution pH was 0.5. The solution was then heated to 95° C., agitated, and mixed with 200 ml. of NaOCl solution (4%, by weight, $Cl_2$) added over a 21.3 minute period, the temperature being maintained at 95° C. At the completion of the NaOCl addition period, the pH had increased to a level of 3.4. Sodium bisulfite was then added to destroy excess $Cl_2$. The treated solution was found to contain less than 0.1 ppm total $CN^-$ compared to 29 ppm total $CN^-$ prior to treatment, thus successfully demonstrating the reduction of both free cyanide and soluble iron cyanide complex.

EXAMPLE III

This example illustrates the use of a chlorination column in conducting the process of this invention.

A solution was prepared using HCN tank washings containing 1,260 ppm total $CN^-$, but containing no insoluble iron cyanides (clear solution), and reagent 11% HCl solution in a 0.066:1 weight ratio (78 ppm $CN^-$ in mixture). This solution was fed from a reservoir heated to 95° C. to the top of the jacketed packed bed column at 9.9 g/min. The column was two feet in height, while the packed section was 18 inches high utilizing ⅛ inch glass helices as the packing material.

The column was fed 2.1 g/min. of gaseous $Cl_2$ to the bottom of the column. The column was operated at atmospheric pressure and maintained at 100° C. with steam on the jacket. The column bottom liquid was collected in a flask containing $FeSO_4$ to destroy excess chlorine. Chlorine venting from the column was removed in a caustic scrubbing column. The column was operated for a period of 28 minutes. The column bottoms after the run analyzed as less than 0.1 ppm total $CN^-$, thus demonstrating effective reduction of the iron cyanide complex.

Variables for a larger column system can include:
height of column—15 feet
height of packing—6-10 feet
packing—2" Intalox ceramic saddles
Chlorine addition rate—1,500 pph
liquid feed rate—376 gallons/minute
liquid feed temperature—95° C.

EXAMPLE IV

The procedure of Example II was repeated under identical conditions with the exception that the temperature of the system was 70° C. and the pH value was 0.5. Analysis revealed that that initial $CN^-$ concentration of 24 ppm was only reduced to 4.2 ppm, an unacceptably high level. It can therefore be seen that effective $CN^-$ destruction is achieved by utilizing a temperature above about 95° C.

EXAMPLE V

HCN wastes containing soluble complex cyanides were treated according to the procedure of Example II with the exception that chlorine was provided by sparging gaseous chlorine into the system at a rate of 0.002-0.004 grams/gram of acidic cyanide solution. Samples were taken from the system at various time intervals and their cyanide content analyzed as follows:

| Chlorination Period (min.) | Cyanide Analysis (ppm) |
| --- | --- |
| 0 | 60 |
| 4 | 20 |
| 10 | 1-5 |
| 13 | <0.01 |

Summarizing, it is seen that this invention provides an efficient and rapid process for destroying soluble cyanide complexes. Variations may be made in proportions, procedures and materials without departing from the scope of the invention as defined by the following claims.

What is claimed is:

1. A method for removing soluble iron cyanide complexes present in an aqueous stream which comprises contacting said aqueous stream containing measurable amounts of cyanide with a concentration of hydrochloric acid sufficient to lower the pH of the system to a level of 3 or below, heating the acidic system to a temperature of at least about 80° C. and contacting the heated acidic system with a source of chlorine.

2. The method of claim 1, wherein said temperature is at least about 95° C.

3. The method of claim 1, wherein said chlorine source is present in a stoichiometric excess concentration of at least about 100%.

4. The method of claim 3, wherein said source of chlorine is gaseous chlorine.

5. The method of claim 3, wherein said source of chlorine is a chlorine-producing compound.

6. The method of claim 4 which is conducted on a counter-current basis in a packed column, said heated acidic system being introduced into the top of the column and said gaseous chlorine being introduced into the bottom of the column.

7. The method of claim 1, wherein said aqueous stream is an industrial waste stream.

8. A method for removing soluble and insoluble iron cyanide complexes present in an aqueous stream which comprises (1) physically removing insoluble iron cyanide complexes from said aqueous stream; (2) contacting said aqueous stream with a concentration of hydrochloric acid sufficient to lower the pH of the system to a level of 3 or below, heating the acidic system to a temperature of at least about 80° C. and contacting the heated acidic system with a source of chlorine; and (3) reacting the cyanogen chloride and ammonium chloride generated in step (2) with a source of chlorine at a pH level of the system of at least about 9.5 and thereafter reacting the resulting system with a source of chlorine at a pH level of the system of from about 6-9.

9. The method of claim 8, wherein said chlorine source in steps (2) and (3) is gaseous chlorine.

10. The method of claim 9, wherein step (2) is conducted on a countercurrent basis in a packed column, said heated acidic system being introduced into the top of the column and said gaseous chlorine being introduced into the bottom of the column.

11. The method of claim 8, wherein said aqueous stream is an industrial waste stream.

* * * * *